(12) United States Patent
Hara et al.

(10) Patent No.: US 9,595,147 B2
(45) Date of Patent: Mar. 14, 2017

(54) VEHICLE INPUT DEVICE

(71) Applicant: SMK Corporation, Tokyo (JP)

(72) Inventors: Tetsuo Hara, Tokyo (JP); Masaki Tsuchiya, Tokyo (JP); Toshiyuki Wakabayashi, Tokyo (JP); Kensaku Mizumoto, Tokyo (JP); Manabu Tago, Kanagawa (JP)

(73) Assignee: SMK Corporation, Tokyo (JP)

( * ) Notice: Subject to any disclaimer, the term of this patent is extended or adjusted under 35 U.S.C. 154(b) by 69 days.

(21) Appl. No.: 14/715,612

(22) Filed: May 19, 2015

(65) Prior Publication Data

US 2015/0254916 A1 Sep. 10, 2015

Related U.S. Application Data

(63) Continuation of application No. PCT/JP2013/053594, filed on Feb. 7, 2013.

(30) Foreign Application Priority Data

Dec. 11, 2012 (JP) ................................. 2012-270335

(51) Int. Cl.
*B60R 25/00* (2013.01)
*G07C 9/00* (2006.01)
*B60R 25/24* (2013.01)

(52) U.S. Cl.
CPC .......... *G07C 9/00309* (2013.01); *B60R 25/24* (2013.01); *G07C 9/00007* (2013.01);
(Continued)

(58) Field of Classification Search
CPC ............ G07C 9/00174; G07C 9/00944; G07C 2009/00968; G07C 2009/00984; B60R 25/24; B60R 25/20; B60R 25/00
See application file for complete search history.

(56) References Cited

U.S. PATENT DOCUMENTS 5,774,043 A * 6/1998 Mizuno ................... B60R 25/00
307/10.2
7,239,227 B1 7/2007 Gupta et al.
(Continued)

FOREIGN PATENT DOCUMENTS

JP S62-448 U 1/1987
JP H10-297391 A 11/1998
(Continued)

OTHER PUBLICATIONS

International Search Report for International Application No. PCT/JP2013/053594, issued by the Japanese Patent Office on Apr. 9, 2013.
(Continued)

*Primary Examiner* — Andrew Bee

(57) ABSTRACT

A vehicle input device for reducing the number of input operation keys of input operation devices that are arranged in a vehicle to control an operation of a large number of controlled apparatuses arranged in the vehicle is provided. An entry key for unlocking or locking a vehicle door is positioned to be movable in a specific input operation direction with respect to a housing fixed inside the vehicle. When the entry key is moved in the input operation direction, the movement is detected, whereby the entry key itself is used as an input operation key for controlling the operation of the controlled apparatuses arranged in the vehicle.

9 Claims, 15 Drawing Sheets

(52) U.S. Cl.
CPC .............. *G07C 9/00944* (2013.01); *G07C 2009/00769* (2013.01)

(56) References Cited

U.S. PATENT DOCUMENTS

| | | | | |
|---|---|---|---|---|
| 2004/0237613 A1* | 12/2004 | Shimura | ............ | E05B 19/0082 70/456 R |
| 2008/0309451 A1* | 12/2008 | Zellweger | .......... | G07C 9/00309 340/3.32 |
| 2012/0116605 A1* | 5/2012 | Seymour | ............... | B60R 25/243 701/1 |
| 2014/0062655 A1* | 3/2014 | Colburn | ............ | G07C 9/00309 340/5.61 |

FOREIGN PATENT DOCUMENTS

| | | |
|---|---|---|
| JP | 2000-33853 A | 2/2000 |
| JP | 2004-224204 A | 8/2004 |

OTHER PUBLICATIONS

Office Action issued for counterpart Japanese Application 2012-270335, issued by the Japanese Patent Office on May 27, 2014.

\* cited by examiner

VEHICLE INPUT DEVICE

CROSS REFERENCE TO RELATED APPLICATION

The contents of the following Japanese and PCT patent application are incorporated herein by reference,
NO. 2012-270335 filed on Dec. 11, 2012, and
NO. PCT/JP2013/053594 filed on Feb. 7, 2013.

FIELD

The present invention relates to an input device which uses an entry key for unlocking doors of a vehicle, and more particularly to a vehicle input device which controls various controlled apparatuses installed in the vehicle, such as a car navigation apparatus, according to an input operation on the entry key itself.

BACKGROUND

There has recently been an entry key for unlocking or locking doors of a vehicle. The entry key includes a built-in wireless transmission circuit and transmission antenna for wirelessly transmitting an unlocking signal or locking signal unique to the vehicle, so that the doors can be unlocked or locked even from a position away from the vehicle. By simply approaching the vehicle to drive and pressing down an unlocking switch of the entry key to transmit the unlocking signal from the transmission antenna, the driver can open the doors of the vehicle and get into the vehicle.

This type of entry key is used only for remote operations to unlock and lock the doors. To operate various controlled apparatuses installed in the vehicle such as a car navigation apparatus, an audio apparatus, and a side mirror angle adjustment apparatus, the driver makes input operations on input operation keys of input devices provided for the respective controlled apparatuses. The input devices are installed on a center console near the driver's seat, a front instrumental panel, and the like in order for a driver to make input operations. The installation of a large number of input operation keys corresponding to different types of controlled apparatuses around the driver's seat damages the appearance of the interior of the vehicle. In addition, the driver's arms can accidentally touch the input devices to cause a malfunction during driving or a hindrance to driving operations.

There has been known an input device for controlling an operation of various electronic devices of a vehicle, the input device itself being accommodated in a casing attached to inside a steering wheel so that the driver can easily make input operations even during driving without the driver's arms touching the input device (Patent Literature 1).

There has also been known an input device in which the entry key for making remote operations to unlock and lock the doors has additional control functions for controlling an operation of controlled apparatuses in a vehicle, such as opening and closing a window and tuning a radio (Patent Literature 2).

CITATION LIST

Patent Literature

Patent Literature 1: Japanese Utility Model Registration Application Laid-Open No. Sho 62-448.

Patent Literature 2: Japanese Patent No. 4814424

SUMMARY

Technical Problem

With the conventional input device accommodated in the casing attached to inside the steering wheel, the casing has a limited size and thus the controlled apparatuses to control and the types of control contents are limited. Since input operations cannot be made from the passenger seat, other input devices need to be installed on a housing in the vehicle. As a result, a large number of input devices are arranged inside the vehicle and the foregoing problem has not been able to be solved.

With the conventional input device including the entry key having additional control functions for controlling the operation of the controlled apparatuses, it is extremely troublesome for the driver to take out the entry key during driving and make an input operation on the controlled apparatuses. In order for a passenger in the passenger seat to make an input operation, the driver needs to hand over the entry key. Consequently, like the foregoing input device, other input devices need to be installed on the housing inside the vehicle. The foregoing problem from the installation of a large number of input devices in the vehicle has thus not been able to be solved.

In either of the foregoing conventional input devices, the entry key needs to be put and held in a pocket, a bag, or the like after the unlocking operation of the vehicle doors. There is a possibility of losing the entry key.

The doors can be unlocked even from a position away from the vehicle by a remote operation. The vehicle can thus be started even if the driver is away from the vehicle with the entry key in his/her pocket or bag. There has thus been a problem of possibility of theft or danger.

The present invention has been achieved in view of the foregoing problems. An object of the present invention is to provide a vehicle input device which eliminates the possibility of leaving behind or losing the entry key.

Another object is to provide a vehicle input device which reduces the number of input devices permanently installed around the driver's seat in order to control an operation of a large number of controlled apparatuses installed in the vehicle.

Solution to Problem

To achieve the foregoing objects, a vehicle input device includes: an entry key that includes wireless transmission means for wirelessly transmitting a lock control signal for unlocking or locking a door of a vehicle; positioning means for positioning the entry key so as to be movable in a specific input operation direction with respect to a housing fixed inside the vehicle; input detecting means for, if the entry key positioned by the positioning means makes a movement in the input operation direction, detecting the movement; and control means for outputting a control signal for controlling an operation of a controlled apparatus installed in the vehicle on the basis of a detected signal detected by the input detecting means.

After the door is unlocked, the entry key is positioned to the housing fixed inside the vehicle. The entry key itself is operated to move and thereby used as an input operation key for operating the controlled apparatus installed in the vehicle.

A vehicle input device is characterized in that: the entry key includes a case that has an outer periphery formed in a disc-like shape to be accommodated in a circular recess formed in the housing, at least a part of a bottom surface of the case being made of a ferromagnetic material; the positing means includes an electromagnetic solenoid that is attached to be rotatable about a center axis of the circular recess along an inner bottom surface of the circular recess, and is attracted to the bottom surface of the case accommodated in the circular recess to position the entry key to the circular recess so as to be rotatable about the center axis; and the input detecting means detects rotation of the entry key from rotation of the electromagnetic solenoid that is attracted to the bottom surface of the case of the entry key and rotates integrally with the entry key.

The ferromagnetic part of the bottom surface of the case is attracted to the electromagnetic solenoid which is attached to be rotatable about the center axis along the inner bottom surface of the circular recess. The entry key is thereby rotatably positioned inside the circular recess. When the entry key is operated to rotate, the electromagnetic solenoid attracted to the bottom surface of the entry key also rotates integrally. The input detecting means thus detects the rotation of the entry key from the rotation of the electromagnetic solenoid.

The rotation axis of the entry key operated to rotate may be off the center axis of the circular recess. Even in such a case, since the electromagnetic solenoid magnetically attracted to the entry key is attached to be rotatable about the center axis, the rotating operation of the entry key can be accurately detected without a displacement from the input detecting means for detecting the rotation.

If the entry key is not used as an input device of the controlled apparatus, the entry key is not accommodated in the circular recess. The housing shows only the circular recess, which will not damage the appearance of the interior of the vehicle.

A vehicle input device is characterized in that: the bottom surface of the case of the entry key is formed in a spherical crown shape with a lowest point at the center; the bottom surface of the circular recess includes a positioning recess that has a diameter smaller than an outer diameter of the case of disc-like shape and is formed to curve about the center axis with approximately the same curvature as that of the bottom surface of the case, and a guide recess of spherical zone shape that surrounds the positioning recess about the same center axis and is formed to curve with a curvature smaller than that of the positioning recess; and the electromagnetic solenoid is attached along an inner bottom surface of the positioning recess.

The periphery of the positioning recess is formed in a basin shape by the guide recess which is formed to curve with the curvature smaller than that of the positioning recess. The bottom surface of the entry key accommodated off the center axis from above makes contact with the guide recess and is guided toward the center axis. The positioning recess formed to curve about the center axis curves with approximately the same curvature as that of the bottom surface of the case of the entry key. The electromagnetic solenoid is attached along the inner bottom surface of the positioning recess. Even if the entry key is accommodated off the center axis of the circular recess from above, the entry key is thus positioned about the center axis of the circular recess.

The positioning recess has the diameter smaller than the outer diameter of the case of disc-like shape. The periphery of the entry key positioned to the positing recess therefore protrudes from the positioning recess. The guide recess around the positioning recess has the curvature smaller than that of the positioning recess. Consequently, a gap to put a finger into is formed between the periphery of the bottom surface of the entry key and the guide recess.

A vehicle input device is characterized in that a click wheel that rotates integrally with the electromagnetic solenoid about the center axis and has a plurality of recess grooves formed in a bottom surface radially from the center axis is attached to the electromagnetic solenoid, and a spherical body is biased toward the click wheel so as to make an elastic contact with the bottom surface of the click wheel and be able to come into and out of the recess grooves.

If the entry key is operated to rotate, the electromagnetic solenoid attracted to the bottom surface of the case of the entry key and the click wheel rotate integrally with the entry key about the center axis. Each time the spherical body comes into a recess groove of the click wheel, the impact is transmitted to the entry key as a click feeling. A plunger is suitably used as the biased spherical body.

A vehicle input device is characterized in that the entry key includes a buttery accommodation portion that opens in the bottom surface of the case, and the opening of the battery accommodation portion is covered with a cover made of a ferromagnetic material.

Since the opening of the battery accommodation portion is covered with the cover made of a ferromagnetic material such as iron, part of the bottom surface of the case is attracted to the electromagnetic solenoid with stronger attractive force.

A vehicle input device further includes approach detecting means for detecting approach of the entry key to the circular recess from a change in a sensing amount due to the approach of the entry key. An exciting current is allowed to pass through a solenoid coil of the electromagnetic solenoid while the approach detecting means detects the approach of the entry key to the circular recess.

For example, the approach detecting means detects the approach of the entry key to the circular recess in a non-contact manner from a change in capacitance due to the approach of the entry key. The iron cover arranged on the bottom surface of the case of the entry key is a conductor. As the entry key approaches, a capacitance formed between detection electrodes or between a detection electrode and the iron cover of the entry key changes greatly. The approach detecting means can thus easily detect the approach.

If the entry key is not accommodated in the circular recess, the approach detecting means does not detect the approach to the circular recess, and no exciting current is caused to pass through the solenoid coil. This prevents the exciting current from flowing uselessly when the entry key is not used as an input device.

A vehicle input device is characterized in that the housing includes a primary coil that is wound about the center axis of the circular recess, and the entry key includes a secondary coil that is wound about the center of the case of disc-like shape and a secondary battery that is charged with an induced current flowing through the secondary coil due to electromagnetic induction with the primary coil.

The secondary battery of the entry key is charged by the primary coil arranged on the housing side of the vehicle. The secondary battery can thus be charged each time the entry key is accommodated in the circular recess. This can prevent the entry key from running out of battery.

If the entry key is positioned to the circular recess, the primary coil and the secondary coil are vertically opposed and arranged about the same center axis. The secondary battery can thus be effectively charged in a noncontact manner by electromagnetic induction.

A vehicle input device is characterized in that the entry key further includes a touch pad that is arranged to be able to detect an input operation on its surface, and input position detecting means for detecting an input operation position on the touch pad. The wireless transmission means wirelessly transmits the detected input operation position to the control means or the controlled apparatus to which the control means outputs the control signal.

The input operation on the touch pad can be used to perform control on the controlled apparatus based on an input operation different from the rotating operation of the entry key.

The input operation position on the touch pad can be directly output to the control means on the vehicle side or the controlled apparatus by using the wireless transmission means which wirelessly transmits the lock control signal for unlocking or locking the door of the vehicle.

A vehicle input device is characterized in that the entry key further includes a touch pad that is arranged to be able to detect an input operation on its surface, and input position detecting means for detecting an input operation position on the touch pad. The entry key wirelessly transmits and outputs the detected input operation position to the control means. The control means converts the input operation position input from the entry key into an absolute input operation position fixed to the housing on the basis of a rotation direction and a rotation angle of the electromagnetic solenoid detected by the input detecting means, and outputs the control signal for controlling operation to the controlled apparatus on the basis of the absolute input operation position.

The direction of the touch pad arranged to be able to detect the input operation on the surface of the entry key rotates according to the rotating operation of the entry key. The input position detecting means detects the input operation position with reference to the rotation position of the entry key. The rotation position of the entry key itself with respect to the housing is obtained from the rotation direction and the rotation angle of the electromagnetic solenoid detected by the input detecting means. The control means thus converts the input operation position with reference to the rotation position of the entry key into an absolute input operation position fixed to the housing in consideration of the rotation position of the entry key itself. Since the housing and the operator do not rotate relative to each other, the absolute input operation position indicates the input operation position input from the direction of the operator. The operation of the controlled apparatus is controlled on the basis of the input operation direction and the input operation position intended by the operator regardless of the rotation position of the entry key.

The rotation direction and the rotation angle of the electromagnetic solenoid, needed for the conversion into the absolute input operation position, can be detected by using the input detecting means for detecting the rotating operation of the entry key.

A vehicle input device further includes positioning detecting means for detecting that the entry key is positioned by the positioning means. The vehicle is enabled to travel on condition that the positioning detecting means detects that the entry key is positioned.

The vehicle will not travel unless the entry key is positioned to the positioning means as an input device. This can prevent the entry key from being left behind outside the vehicle.

According to an aspect of the invention, the entry key is used as an input operation key after the driver gets into the vehicle. This eliminates the possibility of the entry key being held in a pocket or bag and lost. When the driver gets away from the vehicle, the entry key is used to lock the door. This prevents the entry key from being left in the vehicle.

The controlled apparatus installed in the vehicle can be operated only by the input operation of the entry key. This can prevent the controlled apparatus from being stolen by car break-in.

If the entry key is not used as the input device of the controlled apparatus of the vehicle, the entry key does not need to be positioned to the housing. The appearance of the interior of the vehicle is thus not damaged. This also prevents the driver's arms from accidentally touching the input device to cause a malfunction during driving or a hindrance to the driving operation.

According to an aspect of the invention, the entry key itself does not produce magnetic lines of force for the magnetic positioning to the circular recess. The entry key can thus be put in a pocket and carried around without the possibility of causing a malfunction of a portable electronic apparatus or damaging a magnetic card and the like.

The magnetic positioning does not involve passing an exciting current through a solenoid coil on the entry key side. The entry key to be carried around is thus low in battery consumption.

The exciting current caused to pass through the solenoid coil of the electromagnetic solenoid can be changed to adjust the attractive force of the entry key according to the vehicle's driving condition detected by an acceleration sensor. When the vehicle starts or stops suddenly, the attractive force can thus be increased to prevent the entry key from coming off the circular recess.

If the entry key is not used as the input device of the controlled apparatus of the vehicle, only the circular recess appears in the flat surface of the housing. The circular recess can thus be configured as a flat surface without a projection or as a gently curved surface to provide safe interiors with a neat, beautiful appearance around the driver's seat.

The rotating operation of the entry key is detected from the electromagnetic solenoid which rotates integrally inside the housing. The input detecting means is therefore prevented from appearing outside the housing and damaging the appearance.

According to an aspect of the invention, even if the entry key is accommodated from above the circular recess without being deliberately made coincident with the center axis of the circular recess, the entry key is naturally positioned so that its center coincides with the center axis of the circular recess.

The entry key positioned to the circular recess produces a gap between the periphery of the bottom surface and the circular recess. The entry key can thus be easily taken out by putting a finger into the gap.

According to an aspect of the invention, if the entry key is operated to rotate, a click feeling is transmitted from the operated entry key to the operator. The operator thereby obtains an operation feeling of the rotating operation. The angle between the recess grooves in the rotation direction of the click wheel can be adjusted to provide a click feeling at predetermined rotating operation angles. The operator can recognize the speed of the rotating operation and the rotation angle of the entry key from the click feeling received.

The configuration for generating a click feeling, including the biased spherical body (for example, plunger) and the click wheel, does not appear outside the housing. The appearance therefore will not be damaged.

According to an aspect of the invention, the cover covering the battery accommodation portion is made of a ferromagnetic material. The ferromagnetic part of the bottom surface of the case can provide a strong attractive force.

Among typical examples of the ferromagnetic material is iron. Iron is rigid and hardly deformable against external force. Attaching the iron cover along the bottom surface of the case increases the strength of the entire case. The entry key becomes less likely to be damaged even when dropped.

According to an aspect of the invention, the exciting current is not unnecessarily caused to pass through the solenoid coil while the entry key is not used as an input device. For example, suppose a case wherein the approach detecting means is constituted by a method for detecting a change in capacitance, and the cover is made of iron which is both a ferromagnetic material and a conductor. In such a case, the conductor arranged on the bottom surface of the entry key increases the change in capacitance, and the approach detecting means can reliably detect the approach of the entry key to the circular recess.

According to an aspect of the invention, the entry key to be carried around is prevented from running out of battery. With the entry key positioned to the circular recess, the secondary battery of the entry key is efficiently charged in a noncontact manner.

According to an aspect of the invention, the controlled apparatus can be operated by an input operation to the touch pad different from the rotating operation of the entry key.

The input operation position detected by the input position detecting means can be output to the vehicle side by using the wireless transmission means for wirelessly transmitting the lock control signal, without the provision of any additional wireless transmission means.

According to an aspect of the invention, the touch pad for making an input operation and the input position detecting means for detecting the input operation position rotate with the rotation of the entry key. Even in such a case, the operation of the controlled apparatus can be controlled on the basis of the input operation position input from the direction of the operator without being conscious of the rotation position.

The rotation position of the entry key, needed for the conversion into the absolute input operation position, is detected by using the input detecting means for detecting the rotating operation of the entry key. No other rotation position detecting means therefore need to be provided.

According to an aspect of the invention, the vehicle is not able to be started if the entry key is put in a pocket or bag and left behind or if the driver unlocks the door with the entry key and remains away from the car. This can prevent the risks of the entry key being left behind, a theft of the vehicle, a start of traveling due to an accidental operation by children, etc.

DESCRIPTION OF EMBODIMENTS

Figure 1:
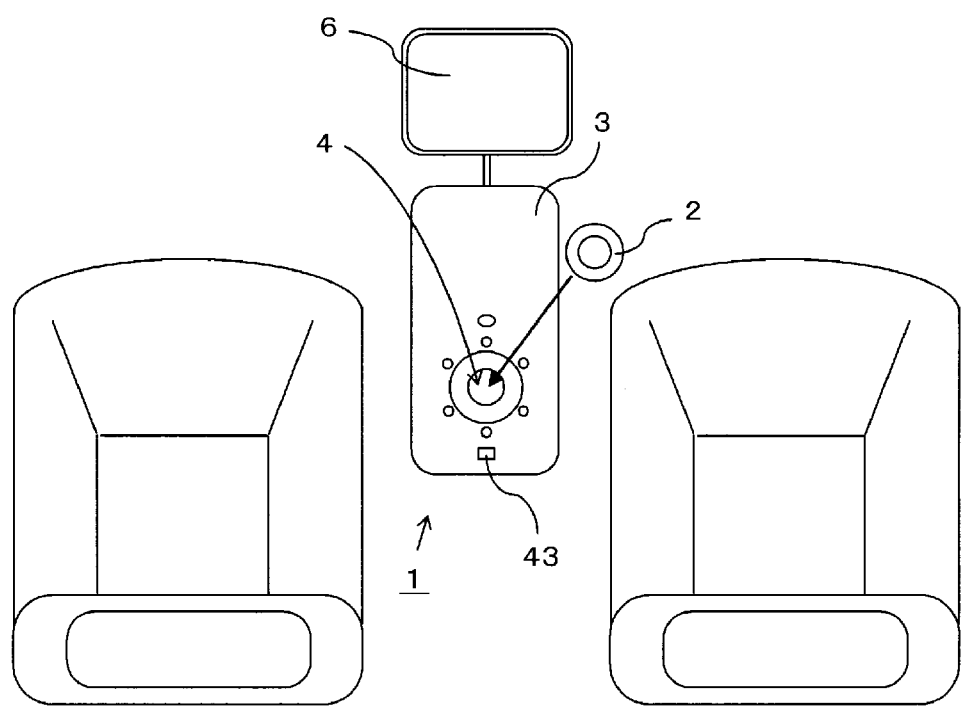
FIG. 1 is a plan view showing a use state of a vehicle input device 1 according to an embodiment of the present invention.
Figure 2:
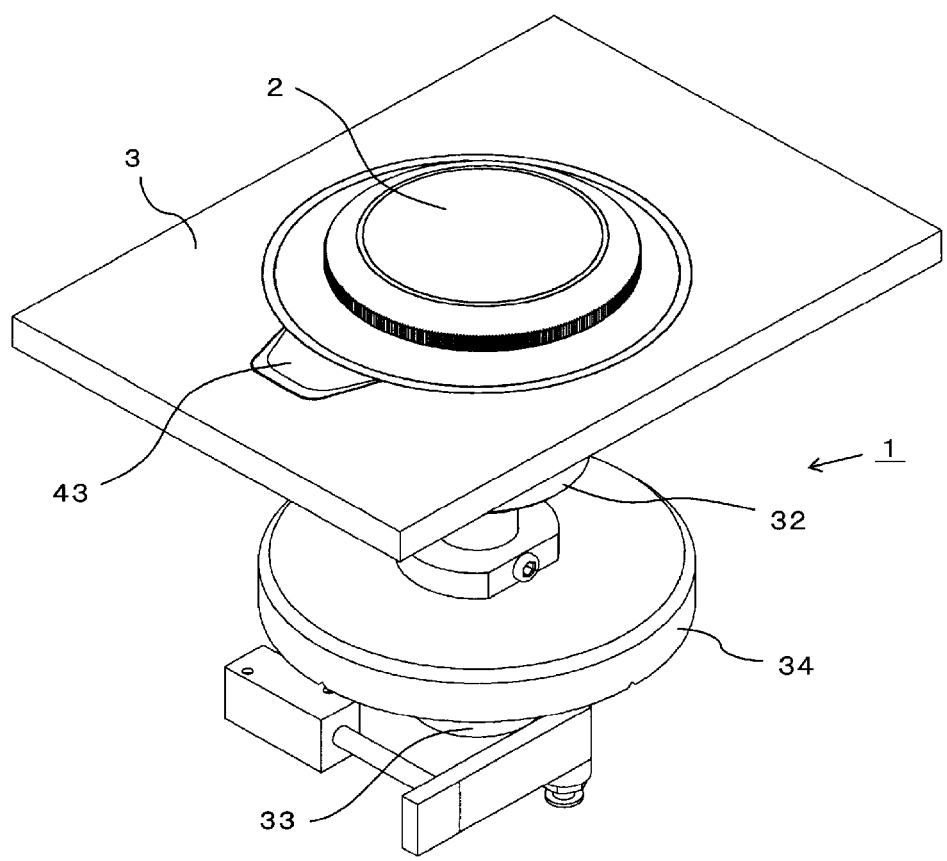
FIG. 2 is a perspective view showing the vehicle input device 1 with a center console 3 broken in part.
Figure 3:
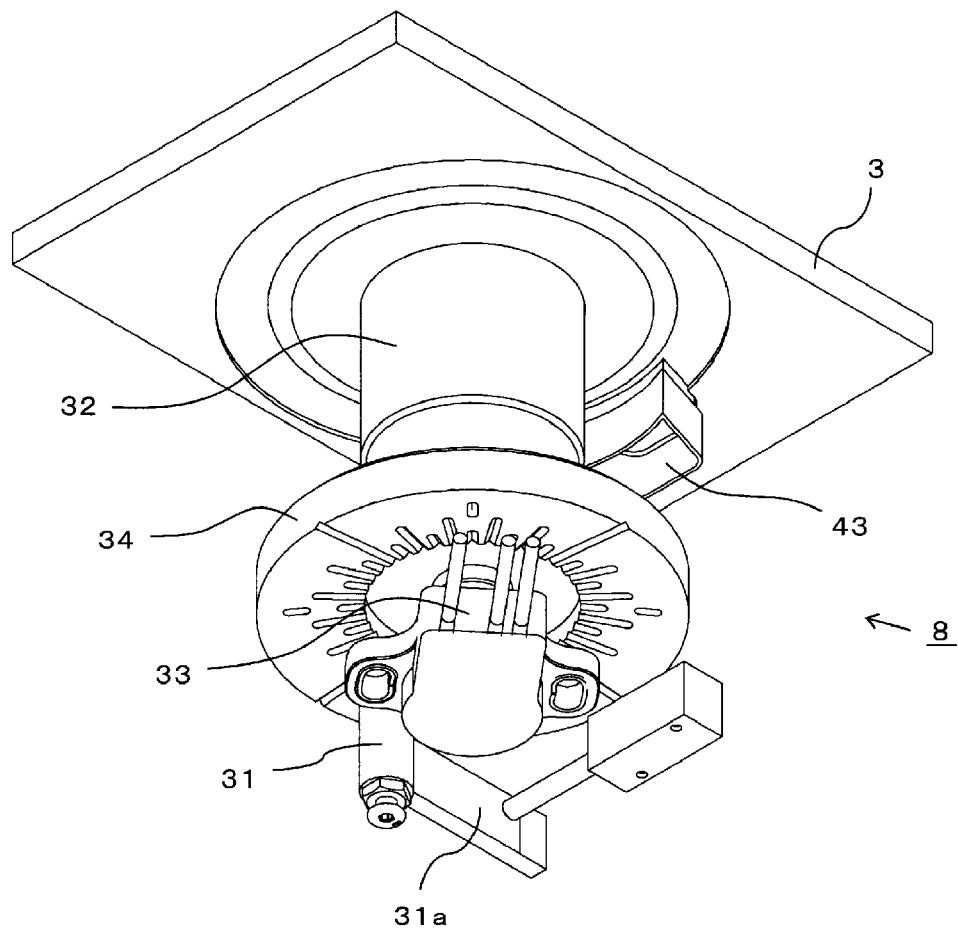
FIG. 3 is a perspective view showing vehicle-side parts 8 in the center console 3.

A vehicle input device 1 according to an embodiment of the present invention will be described in detail below with reference to FIGS. 1 to 14. The vehicle input device 1 uses an entry key 2 as an input operation key of controlled apparatuses installed in a vehicle, such as a car navigation apparatus. The entry key 2 wirelessly transmits a lock signal for unlocking or locking doors of a vehicle. As shown in FIG. 1, a driver unlocks the doors, gets into the vehicle, and places the entry key 2 used to unlock the doors on a circular recess 4 formed in a center console 3. The driver uses the entry key 2 as an input operation key to be operated to rotate about the center axis of the circular recess 4.

The center console 3 includes an electromagnetic solenoid 32 and a rotary encoder 33 inside. The electromagnetic solenoid 32 rotatably positions the entry key 2 to the circular recess 4. The rotary encoder 33 detects the rotating operation of the entry key 2. The entry key 2, the circular recess 4 of the center console 3, and the component parts arranged inside the center console 3 (hereinafter, referred to as vehicle-side parts 8) that constitute the vehicle input device 1 will be described in detail below in order.

Figure 9:
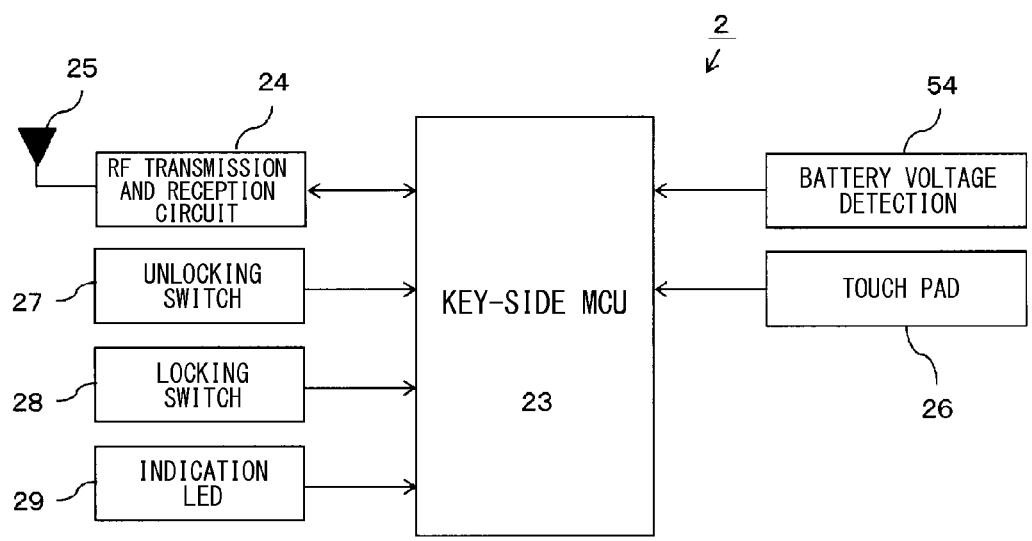
FIG. 9 is a block diagram showing circuits of the entry key 2.

As shown in FIG. 9, the entry key 2 includes a microcomputer unit (referred to as a key-side MCU) 23 for performing various functions of the entry key 2. The key-side MCU 23 is connected with an RF transmission and reception circuit 24, a transmission and reception antenna 25, two types of switches including an unlocking switch 27 and a locking switch 28, an indication LED 29, a battery voltage detection circuit 54, and a touch pad 26. The RF transmission and reception circuit 24 and the transmission and reception antenna 25 are intended to wirelessly transmit the lock signal for unlocking or locking the vehicle doors.

Figure 6:
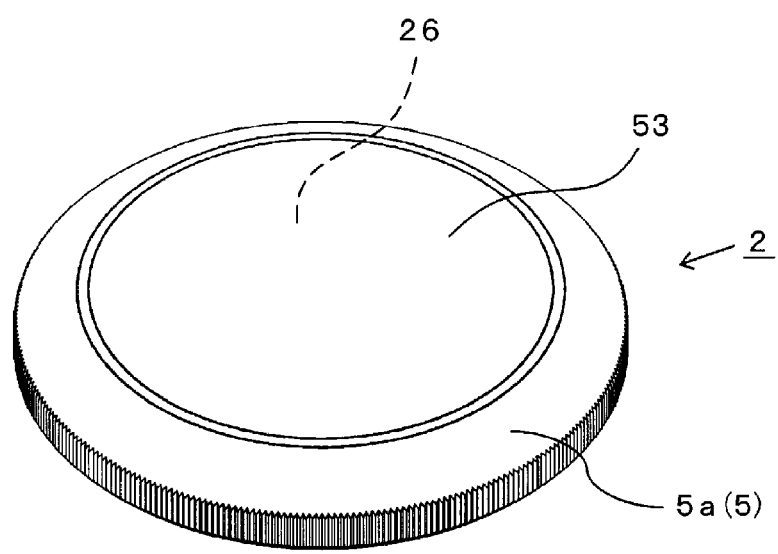
FIG. 6 is a perspective view of an entry key 2 as seen from obliquely above.
Figure 7:
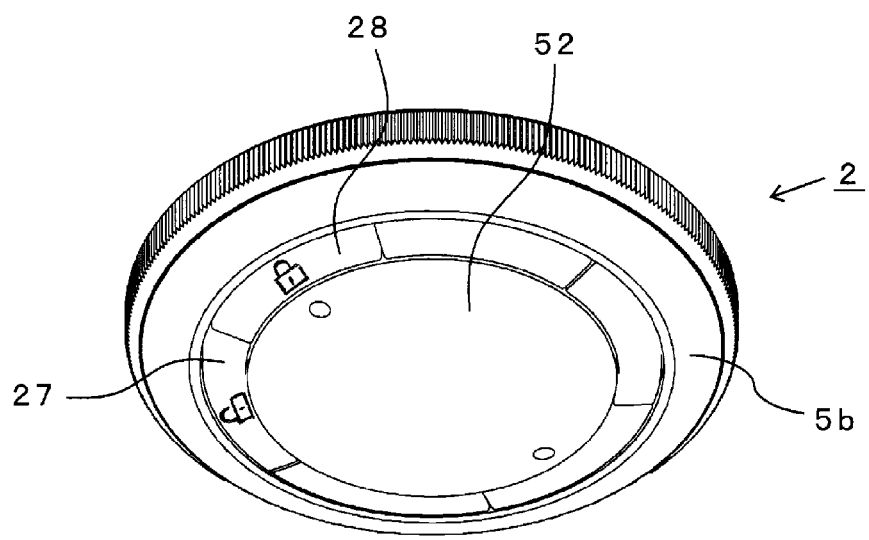
FIG. 7 is a perspective view of the entry key 2 as seen from obliquely below.
Figure 8:
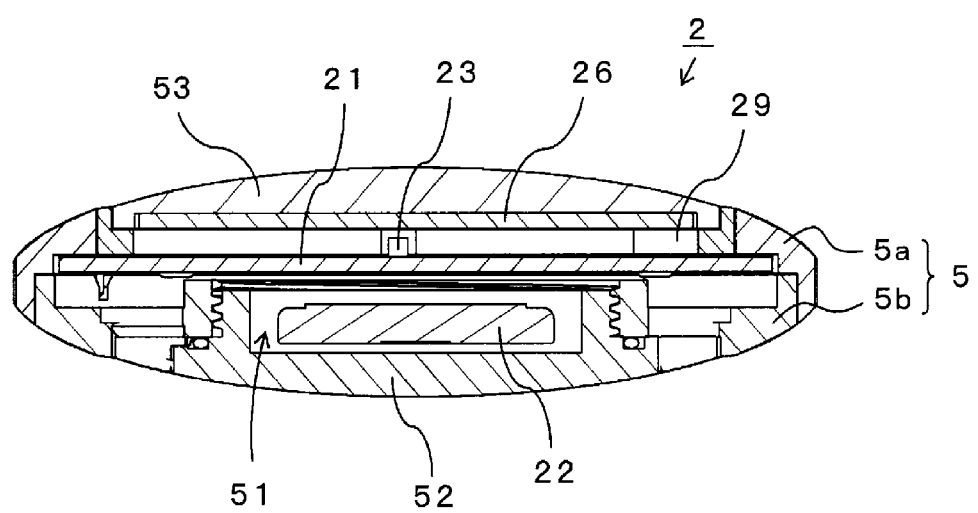
FIG. 8 is a longitudinal sectional view of the entry key 2.

As shown in FIGS. 6 to 8, a case 5 of the entry key 2 is a combination of an upper case 5a and a lower case 5b which are made of a synthetic resin. The case 5 is formed in a disc-like shape having a size capable of being held by hand, with a diameter of approximately 6 cm. The case 5 accommodates the touch pad 26, a printed circuit board 21, a button battery 22, etc. Circuit elements such as the foregoing key-side MCU 23 and the RF transmission and reception circuit 24 are mounted on the printed circuit board 21.

The touch pad 26 is formed to have a circular outline so that even if the entry key 2 is rotated, input operations can be made without being conscious of the rotation position. The surface of the touch pad 26 is covered with a touch pad cover 53 which is made of the same synthetic resin as that of the case 5. The touch pad cover 53 and the surface of the surrounding upper case 5a form a continuous surface of spherical crown shape curved upward.

A battery accommodation portion 51 of cylindrical shape is formed in the center of the lower case 5b so as to open in the bottom surface of the lower case 5b. The button battery 22 is accommodated in the battery accommodation portion 51. The opening at the bottom side of the battery accommodation portion 51 is covered with a ferromagnetic iron cover 52 which is threadedly attached to the inner wall surface of cylindrical shape. As shown in FIG. 7, the unlocking switch 27 and the locking switch 28 are attached to the periphery of the battery accommodation portion 51, with their respective operation surfaces of sector shape along the circumference of the cover 52. The cover 52, the operation surfaces of the unlocking switch 27 and the locking switch 28, and the bottom surface of the lower case 5b form a continuous surface of spherical crown shape on the bottom side of the case 5. The continuous surface is curved downward with the same curvature as that of the upper case 5a.

If a press-down operation is made on the unlocking switch 27 or the locking switch 28, the key-side MCU 23 detects the operation and outputs a corresponding lock signal for unlocking or locking to the RF transmission and reception circuit 24. The RF transmission and reception circuit 24 outputs the input lock signal as a wireless signal to the transmission and reception antenna 25 which is made of a pattern of the printed circuit board 21. The lock signal is thereby transmitted to a transmission and reception antenna 37 shown in FIG. 14, which is installed on the vehicle side.

The touch pad 26 detects an input operation position on the touch pad 26 by an electrostatic method. A plurality of Y detection electrodes along an X direction and a plurality of X detection electrodes along a Y direction are laid on the surface of the touch pad 26 so as to be insulated from each other. Each time the key-side MCU 23 outputs a predetermined detection signal to a Y detection electrode, the key-side MCU 23 detects the detection signals detected by all the X detection electrodes. In such a manner, the key-side MCU 23 outputs the detection signal to all the Y detection electrodes for scanning. Suppose that an operator's finger touches the touch pad cover 53. When the detection signal is output to a Y detection electrode closest to the finger, the detection signal of the highest level is detected from an X detection electrode closest to the finger. The key-side MCU 23 detects the operation input position of the finger on the touch pad 26 from the wiring positions of the Y detection electrode and the X detection electrode.

If an input operation position is detected, the key-side MCU 23 wirelessly transmits an input position detection signal indicating the input operation position to the transmission and reception antenna 37 on the vehicle side by using the RF transmission and reception signal 24 and the transmission and reception antenna 25 which transmit the lock signal. The input position detection signal is output to a vehicle-side MCU 36 via an RF transmission and reception circuit 38 on the vehicle side. An operation of the vehicle-side MCU 36 will be described later.

The battery voltage detection circuit 54 monitors the voltage of the button battery 22 accommodated in the battery accommodation portion 51. If the button battery 22 runs low and the voltage falls to or below a predetermined voltage, the battery voltage detection circuit 54 issues a notification to the key-side MCU 23. Receiving the notification from the battery voltage detection circuit 54, the key-side MCU 23 controls the indication LED 29 to turn on to prompt the operator to replace the button battery 22.

Figure 10:
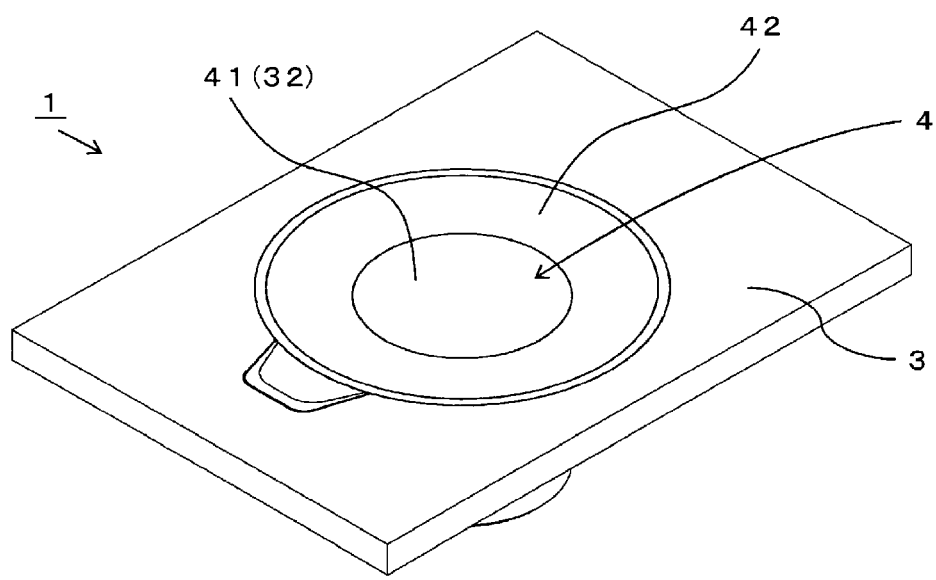
FIG. 10 is a perspective view of the vehicle input device 1 without the entry key 2 being accommodated.
Figure 11:
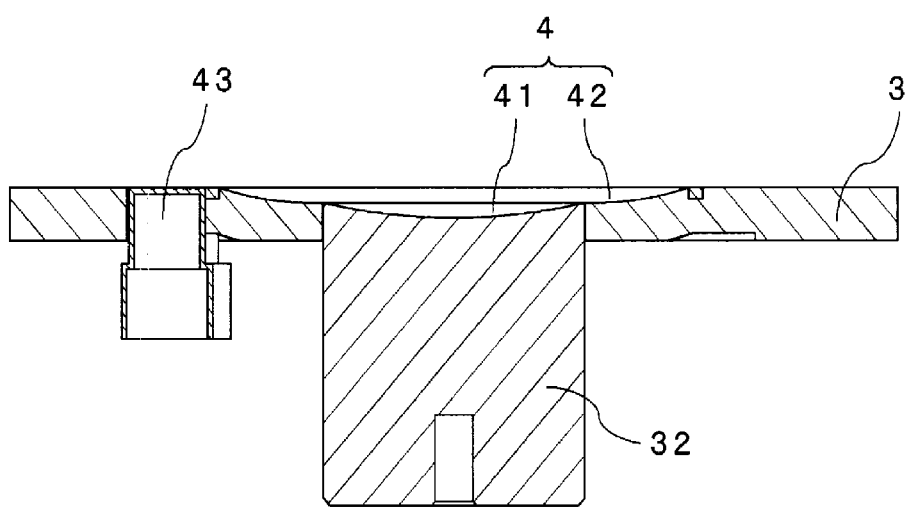
FIG. 11 is a longitudinal sectional view showing a circular recess 4 of the center console 3.

As shown in FIG. 10, the circular recess 4 formed in the center console 3 includes a positioning recess 41 and a guide recess 42. The positioning recess 41 is formed to be curved in a spherical crown shape, with the lowest point at the center. The positioning recess 41 has approximately the same curvature as that of the bottom surface of the case 5. The guide recess 42 has a spherical zone shape surrounding the periphery of the positioning recess 41 about the same center axis. The guide recess 42 is formed to be curved downward with a curvature smaller than that of the positioning recess 41. As shown in FIG. 11, the positioning recess 41 is formed by a flat surface of the electromagnetic solenoid 32 which is arranged to be rotatable about the center axis in the circular hole of the guide recess 42. The flat surface of the electromagnetic solenoid 32 serving as an attraction surface is formed to be curved in a spherical crown shape. The attraction surface faces the interior of the circular hole of the guide recess 42 so that the guide recess 42 is continuous with the periphery of the positioning recess 41 about the same rotation axis.

Figure 5:
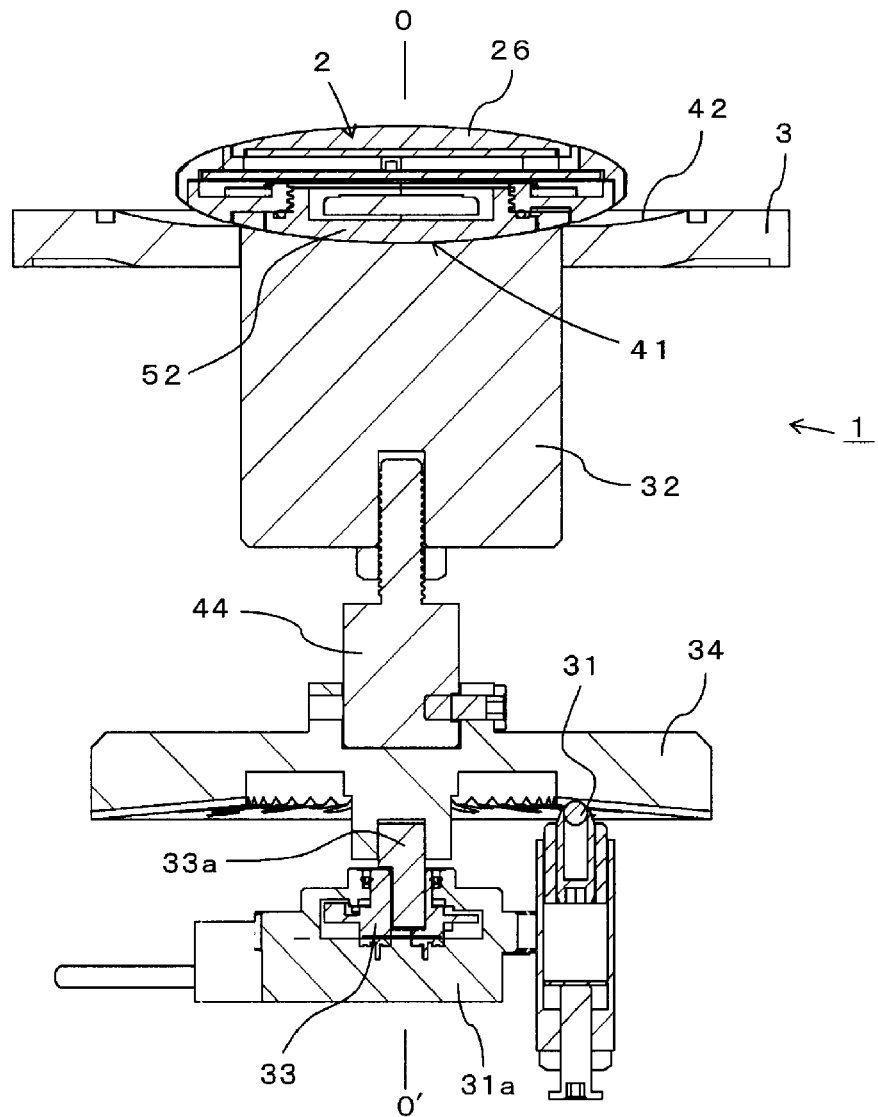
FIG. 5 is a longitudinal sectional view of the vehicle input device 1.

The periphery of the positioning recess 41 is formed in a basin shape by the guide recess 42. Consequently, even if the entry key 2 of disc-like shape is placed off the center axis of the circular recess 4 from above, the bottom surface of the entry key 2 makes contact with the guide recess 42 and is guided toward the center axis. The ferromagnetic iron cover 52 of spherical crown shape is exposed in the bottom surface of the entry key 2. The positioning recess 41 formed by the attraction surface of the electromagnetic solenoid 32 is curved with approximately the same curvature as that of the bottom surface of the entry key 2. As shown in FIG. 5, the entry key 2 guided toward the center axis is thus positioned so that its center coincides with the center axis of the positioning recess 41.

In the present embodiment, the positioning recess 41 has an outline having a diameter smaller than that of the case 5 of disc-like shape. The guide recess 42 around the positioning recess 41 has a curvature smaller than that of the positioning recess 41. As shown in FIG. 5, the periphery of the entry key 2 positioned to the positioning recess 41 therefore protrudes from the positioning recess 41, whereby a gap to put a finger into is formed between the entry key 2 and the guide recess 42. The entry key 2 positioned to the circular recess 4 can thus be easily taken out by putting a finger into the gap.

Figure 14:
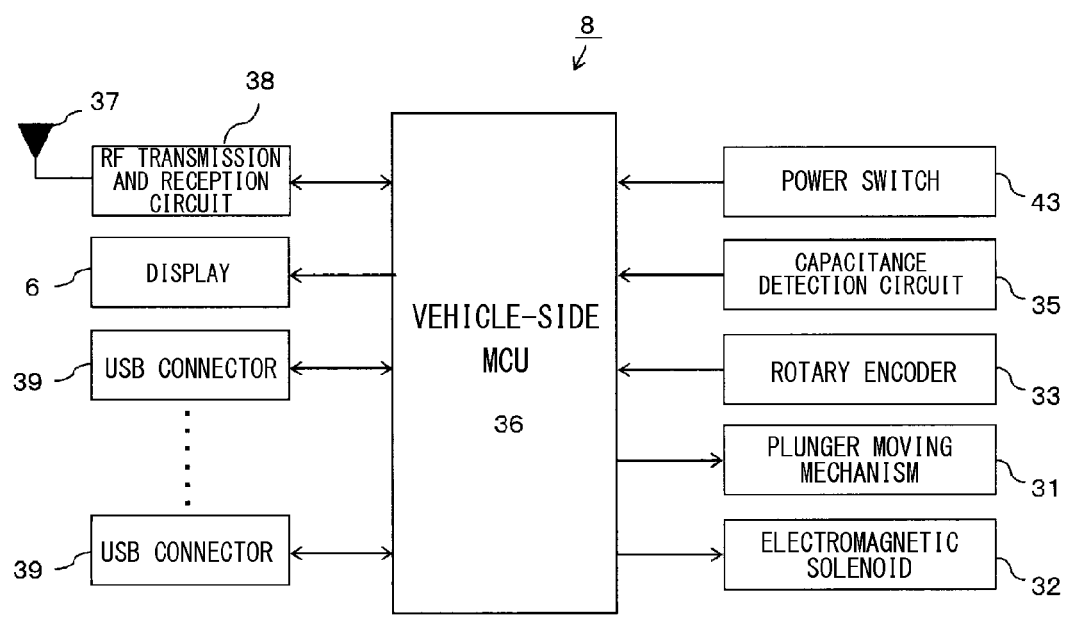
FIG. 14 is a block diagram showing circuits of the vehicle-side parts 8 on the side of the center console 3.

As shown in FIG. 14, the vehicle-side parts 8 arranged inside the center console 3 include the vehicle-side microcomputer unit (referred to as vehicle-side MCU) 36. The vehicle-side MCU 36 is connected with the RF transmission and reception circuit 38 to which the transmission and reception antenna 37 is connected, a capacitance detection circuit 35 serving as approach detecting means, a power switch 43 constituted by an illumination switch, the electromagnetic solenoid 32, the rotary encoder 33 for detecting the rotation of the electromagnetic solenoid 32, a plunger moving mechanism 31a, a display 6, and a plurality of USB connectors 39 capable being connected to respective controlled apparatuses in the vehicle.

The capacitance detection circuit 35 outputs a capacitance between a pair of not-shown detection electrodes arranged in the center console 3 around the circular recess 4 to the vehicle-side MCU 36 as digitized capacitance data. The vehicle-side MCU 36 has a capacitance threshold that is set to a value greater than the capacitance data input from the capacitance detection circuit 35 when the entry key 2 is in a remote position outside the vehicle, and smaller than when the entry key 2 is close to the circular recess 4. While capacitance data exceeding the capacitance threshold is input from the capacitance detection circuit 35, the vehicle-side MCU 36 determines that the entry key 2 is close to or accommodated in the circular recess 4. As will be described later, the vehicle-side MCU 36 then causes an exciting current to pass through the solenoid coil of the electromagnetic solenoid 32, and the electromagnetic solenoid 32 performs an attracting operation. The power switch 43 is located in front of the circular recess 4. If a press-down operation has not been made on a key of the power switch 43 yet, the vehicle-side MCU 36 controls the illumination of the key to periodically turn on and off to prompt operation.

If the press-down operation is made on the power switch 43, all the other electronic devices in the vehicle are activated and the vehicle is enabled to travel. The vehicle-side MCU 36 controls the key of the power switch 43 to be continuously on. If the shift lever of the vehicle is in a parking position and a press-down operation is made on the power switch 43 again, the main electronic devices of the vehicle stop operation except those operating during standby, such as the capacitance detection circuit 35. While capacitance data exceeding the capacitance threshold is input, the vehicle-side MCU 36 controls the illumination of the key to periodically turn on and off.

The electromagnetic solenoid 32, one of the vehicle-side parts 8 mentioned above, is constituted by winding the solenoid coil about the center axis of a columnar core and surrounding the resultant with a columnar yoke. The electromagnetic solenoid 32 is attached to a not-shown attachment member of the center console 3 so that, as described above, its flat surface serves as the positioning recess 41 and so as to be rotatable about the center axis of the circular recess 4. Both ends of the solenoid coil are exposed in the surface of the yoke as movable electrodes of ring shape. A pair of elastic contact pieces (not shown) on the vehicle side are put into contact with the pair of respective movable electrodes. The pair of elastic contact pieces is thereby electrically connected to the respective ends of the solenoid coil all the time regardless of the rotation position of the electromagnetic solenoid 32 about the center axis. When an exciting current is allowed to pass through the solenoid coil, the electromagnetic solenoid 32 functions as an electromagnet that attracts the iron cover 52 of the entry key 2 to the positioning recess 41. The vehicle-side MCU 36 controls the exciting current flowing through the solenoid coil via the pair of elastic contact pieces to control the attractive force during the attracting operation. If the exciting current is allowed to pass through the solenoid coil for a long time, magnetism may remain in the core and the yoke even after the supply of the exciting current is stopped. To address such a problem, the vehicle-side MCU 36 is configured to cause an electromagnetic current to pass in a reverse direction for an extremely short time to demagnetize the residual magnetism in a predetermined point of time.

For a predetermined time immediately after capacitance data exceeding the capacitance threshold is input from the capacitance detection circuit 35 and the electromagnetic solenoid 32 starts an attracting operation, the vehicle-side MCU 36 causes a relatively high exciting current to pass to strongly attract the entry key 2 temporarily placed on the circular recess 4. As a result, the entry key 2 is guided toward the center axis by the guide recess 42. The iron cover 52 of spherical crown shape exposed in the bottom surface of the entry key 2 is attracted to the flat surface of the electromagnetic solenoid 32 which is curved with the same curvature. As shown in FIG. 5, the entry key 2 is thus securely positioned so that its center coincides with the center axis of the positioning recess 41.

As will be described later, the vehicle-side MCU 36 may detect a rotating operation of the entry key 2 or an input to the touch pad 26 via an input from the rotary encoder 33 or the RF transmission and reception circuit 38. An acceleration sensor of the vehicle may detect a sudden start or sudden stop of the vehicle. In such cases, the vehicle-side MCU 36 causes a relatively high exciting current to pass through the solenoid coil so that the entry key 2 will not come off the circular recess 4.

Figure 12:
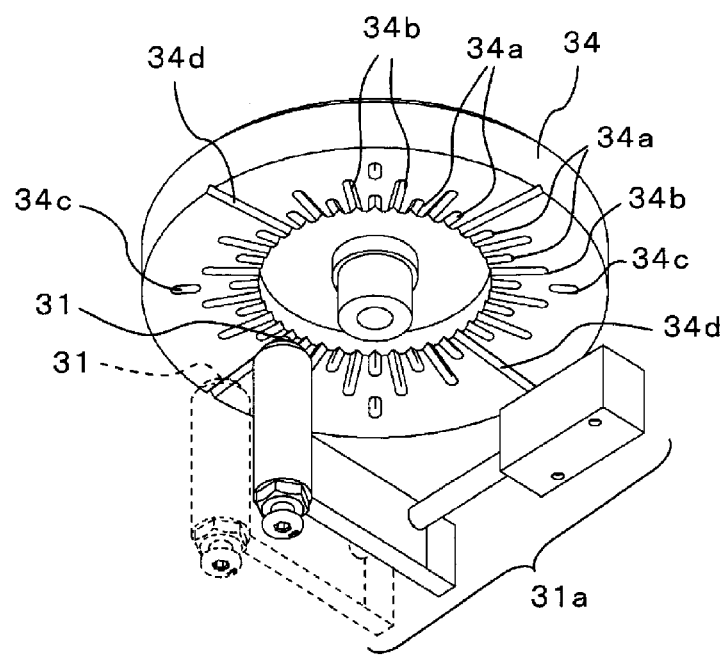
FIG. 12 is a perspective view showing a plunger 31 which makes an elastic contact with the bottom surface of a click wheel 34.
Figure 13:
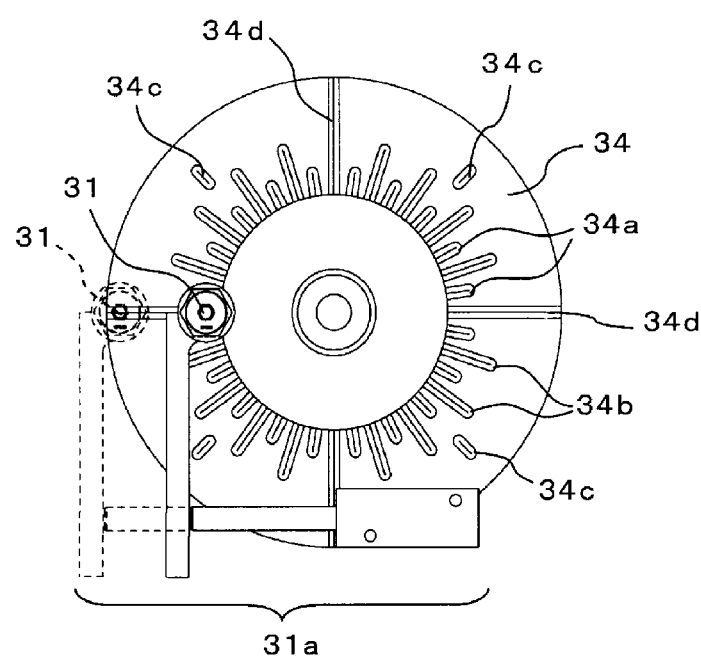
FIG. 13 is a bottom view of the plunger 31 which makes an elastic contact with the bottom surface of the click wheel 34.

As shown in FIG. 5, a connection shaft 44 is suspended on a portion of the bottom surface of the electromagnetic solenoid 32 where to cross a center axis O-O'. The connection shaft 44 rotates integrally with the electromagnetic solenoid 32. A click wheel 34 is attached to the bottom end of the connection shaft 44. The click wheel 34 rotates integrally with the electromagnetic solenoid 32 about the center axis O-O'. The bottom surface of the click wheel 34 is formed to curve gently convex upward from the periphery to the center. As shown in FIGS. 12 and 13, the bottom surface has four types of recess grooves 34a, 34b, 34c, and 34d that are radially formed from the center at respective equal angular intervals in respective different lengths.

A plunger 31 is supported by the plunger moving mechanism 31a which includes a solenoid and a link. A spherical body at the end of the plunger 31 makes an elastic contact with the bottom surface of the click wheel 34 from below. The vehicle-side MCU 36 controls the solenoid of the plunger moving mechanism 31a to move the elastic contact position of the spherical body at the end of the plunger 31 in a radial direction of the bottom surface of the click wheel 34 as shown in FIG. 12. If the plunger 31 is controlled to move to a first position closest to the center, the plunger 31 temporarily comes into the recess grooves 34a, 34b, and 34d in the bottom surface of the rotating click wheel 34 as shown in solid lines in FIGS. 12 and 13. This generates torque in the rotation direction at intervals of 9°. Similarly, if the plunger 31 is controlled to move to a second position somewhat radially outer than the solid-line position, the plunger 31 temporarily comes into the recess grooves 34b and 34d. If the plunger 31 is controlled to move to a third position radially further outside, the plunger 31 temporarily comes into the recess grooves 34c and 34d. If the plunger 31 is controlled to move to the outermost fourth position shown in broken lines in FIGS. 12 and 13, the plunger 31 temporarily comes into the recess grooves 34d. In the second, third, and fourth positions, the plunger 31 generates torque in the rotation direction at respective different intervals of 18°, 45°, and 90°.

The entry key 2 positioned to the positioning recess 41 is attracted to the electromagnetic solenoid 32. If the entry key 2 is operated to rotate about the center axis, the electromagnetic solenoid 32 and the click wheel 34 also rotate integrally. Each time the plunger 31 comes into and passes any one of the recess grooves 34a, 34b, 34c, and 34d, torque occurs in the click wheel 34 in a direction opposite to that of the operation. The torque is transmitted to the operator who operates the entry key 2 to rotate, as a click feeling. The bottom surface of the click wheel 34 is formed to curve gently convex upward from the periphery to the center. As the plunger 31 moves from the first position to the fourth position, the elastic force by which the plunger 31 makes an elastic contact with the bottom surface of the click wheel 34 increases. The wider the interval of generation of the click feeling, the stronger the generated click feeling is. Consequently, the vehicle-side MCU 36 can control the plunger moving mechanism 31a to adjust the interval of generation of the click feeling with respect to each control content for controlling the operation of a controlled apparatus. When performing control to make a fine adjustment by operating the entry key 2 to rotate slightly, the vehicle-side MCU 36 can control the plunger 31 to move to the first position so that a light click feeling occurs at every small rotation angle. When performing a rough control such as fast-forwarding by operating the entry key 2 to rotate at high speed, the vehicle-side MCU 36 can control the plunger 31 to move to the fourth position so that a heavy click feeling occurs at long intervals of rotation angle.

Figure 4:
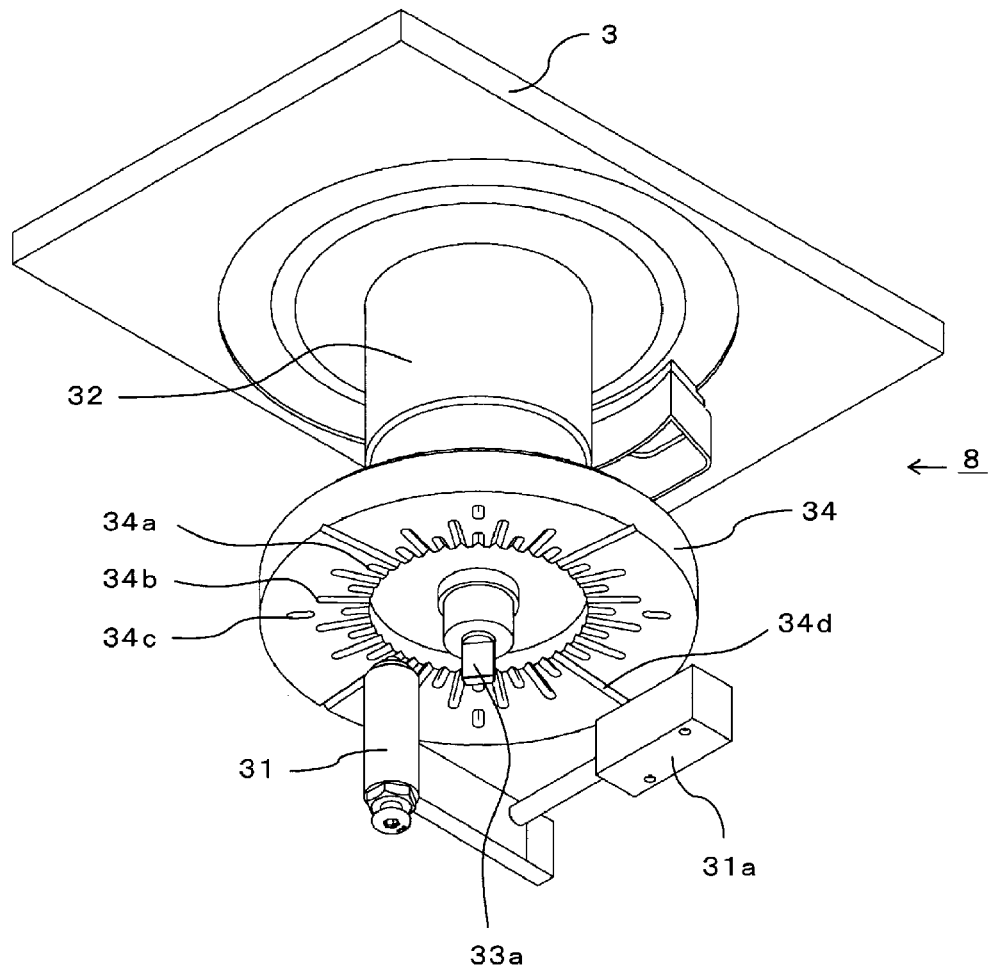
FIG. 4 is a perspective view showing the vehicle-side parts 8 of FIG. 3 excluding a rotary encoder 33.

As shown in FIGS. 4 and 5, the center portion of the bottom surface of the click wheel 34 is protruded downward in a columnar shape. The rotary encoder 33 is attached to the columnar protrusion with its input shaft portion 33a fixed along the center axis. The circular recess 4, the electromagnetic solenoid 32, the click wheel 34, and the input shaft portion 33a, from the top to the bottom, are formed on the same center axis. If the entry key 2 positioned to the circular recess 4 is operated to rotate about the center axis, the electromagnetic solenoid 32 attracting the entry key 2 rotates integrally about the center axis. The rotary encoder 33 can thus detect the direction of the rotating operation and the rotation angle of the entry key 2 from the rotation of the input shaft portion 33a integral with the electromagnetic solenoid 32.

The entry key 2 may be operated to rotate in the circular recess 4 about an axis somewhat off the center axis O-O' of the circular recess 4. Even in such a case, since the electromagnetic solenoid 32 itself is positioned by the center console 3 so as to be rotatable about the center axis, the rotary encoder 33 can detect the rotating operation of the entry key 2 from the rotation of the electromagnetic solenoid 32 without a problem.

The input detecting means for detecting the rotating operation of the entry key 2 are not arranged on the surface side of the center console 3 around the entry key 2. This can give the center console 3a neat, beautiful design.

A rotation detection signal about the direction of the rotating operation and the rotation angle of the entry key 2 detected by the rotary encoder 33 is output to the vehicle-side MCU 36. Based on the rotation detection signal, the vehicle-side MCU 36 moves icons representing controlled apparatuses displayed on the display 6 to select a controlled apparatus to control. The vehicle-side MCU 36 generates a control signal for controlling an operation of the controlled apparatus, and outputs the control signal to the controlled apparatus connected to a USB connector 39.

The vehicle-side MCU 36 stores an initial rotation position of the entry key 2 when a press-down operation is made on the power switch 43. Each time a new rotation detection signal is input, the vehicle-side MCU 36 accumulates the direction of the rotating operation and the rotation angle indicated by the new input rotation detection signal with the initial rotation position, and stores the current rotation position obtained by the accumulation. The initial rotation position indicates the direction of the touch pad 26 with respect to the operator when the operator initially places the entry key 2 on the circular recess 4. In other words, the initial rotation position indicates the direction of the touch pad 26 coincident with the intention of the operator about the input operation direction. The current rotation position indicates the direction of the touch pad 26 with respect to the operator after the entry key 2 is operated to rotate.

The vehicle-side MCU 36 is connected with the plurality of USB connectors 39 which are connected to a respective plurality of types of controlled apparatuses such as a car navigation apparatus. The vehicle-side MCU 36 can select any one of the USB connectors 39 to selectively control the operation of the controlled apparatuses. The display 6 connected to the vehicle-side MCU 36 displays a list of such controlled apparatuses connected to the USB connectors 39, a list of control contents for controlling the operation of the controlled apparatuses, a route on a map displayed by the car navigation apparatus serving as a controlled apparatus, etc. The operator observes such display while operating the entry key 2 to rotate and making an input operation on the touch pad 26. The vehicle input device 1 according to the present embodiment is configured so that the dedicated display 6 is connected to the vehicle-side MCU 36. However, a display for displaying a route map of the car navigation apparatus may be used instead.

The lock signal for unlocking or locking the vehicle doors or the input position detection signal indicating the input operation position on the touch pad 26 is input to the vehicle-side MCU 36 via the transmission and reception antenna 25 and the RF transmission and reception circuit 24. If the lock signal is input, the vehicle-side MCU 36 outputs the lock signal to a door lock mechanism which is connected via a not-shown output interface. The vehicle doors are controlled to unlock or lock according to the lock signal. If the input position detection signal indicating the input operation position on the touch pad 26 is input, the vehicle-side MCU 36 corrects the input operation position of the input position detection signal input thereto into an input operation position expressed with reference to the initial rotation position, on the basis of a relative rotation direction and a relative rotation angle between the current rotation position and the initial rotation position. The vehicle-side MCU 36 generates a control signal on the basis of the corrected input operation position, and outputs the control signal to the controlled apparatus. The input operation position corrected by the vehicle-side MCU 36 is the input operation position to the touch pad 26 coincident with the intention of the operator about the input operation direction. Even if the touch pad 26 rotates with the rotating operation of the entry key 2, the operator can make an input operation on the touch pad 26 without being conscious of the rotating movement.

A situation when using the vehicle input device 1 configured as described above will be described below. If the driver approaches the parked vehicle and makes a press-down operation on the unlocking switch 27 of the entry key 2, the lock signal for unlocking control is wirelessly transmitted from the transmission and reception antenna 25 of the entry key 2. The lock signal is input from the transmission and reception antenna 37 on the vehicle side to the vehicle-side MCU 36. The vehicle doors are controlled to unlock according to the input lock signal.

The driver opens the door and sits on the driver's seat. As shown in FIG. 1, the driver temporarily places the entry key 2 on the guide recess 42 so that the entry key 2 is accommodated into the circular recess 4 of the center console 3. Here, the capacitance between the pair of detection electrodes arranged around the circular recess 4 exceeds the capacitance threshold due to the approach of the iron cover 52 arranged on the bottom surface of the entry key 2. A relatively high exciting current is thus allowed to pass through the solenoid coil of the electromagnetic solenoid 32, whereby the entry key 2 temporarily placed is strongly attracted. As a result, the entry key 2 is guided toward the center axis along the guide recess 42. The iron cover 52 of spherical crown shape exposed in the bottom surface of the entry key 2 is attracted to the flat surface of the electromagnetic solenoid 32 curved with the same curvature, and is securely positioned with its center coincident with the center axis of the positioning recess 41.

If the shift lever of the vehicle is in the parking position while the capacitance data exceeding the capacitance threshold is input from the capacitance detection circuit 35, the vehicle-side MCU 36 periodically turns on and off the key of the power switch 43. If the driver makes a press-down operation on the power switch 43, the key of the power switch 43 is continuously turned on. All the electronic devices in the vehicle are activated and the vehicle becomes ready to start. A menu screen for selecting the controlled apparatuses is displayed on the display 6, and the controlled apparatuses become controllable by rotating operations of the entry key 2 and input operations on the touch pad 26. At the same time, the rotation position of the entry key 2 here is stored into a not-shown storage unit in the vehicle-side MCU 36 as an initial rotation position.

If the entry key 2 is operated to rotate about its center, the electromagnetic solenoid 32 of which the flat surface is attracted to the bottom surface of the entry 2 rotates integrally with the entry key 2 about the center axis. The click wheel 34 and the input shaft portion 33a of the rotary encoder 33 rotate integrally with the electromagnetic solenoid 32. While the entry key 2 is operated to rotate, a click feeling occurs each time the plunger 31 passes the recess grooves 34a, 34b, 34c, and 34d. The vehicle-side MCU 36 can control the plunger moving mechanism 31a to adjust the intensity and interval of the click feeling according to the control contents of the rotating operation. Consequently, the operator can obtain a guide for the rotating operation of the entry key 2 from the intensity and frequency of the click feeling adjusted according to the contents controlled by the rotating operation.

The rotary encoder 33 outputs the rotation detection signal about the direction of the rotating operation and the rotation angle of the entry key 2 detected from the rotation of the input shaft portion 33a to the vehicle-side MCU 36. Based on the rotation detection signal, the vehicle-side MCU 36 moves the icons of the controlled apparatuses displayed on the display 6 to select a controlled apparatus to control. The vehicle-side MCU 36 generates a control signal for controlling the operation of the selected controlled apparatus, and outputs the control signal to the controlled apparatus connected to a USB connector 39, thereby making the controlled apparatus perform a desired operation. Each time the rotation detection signal is input, the vehicle-side MCU 36 accumulates the direction of the rotating operation and the rotation angle indicated by the input rotation detection signal. The vehicle-side MCU 36 thereby determines the current rotation position which indicates the rotation position where the entry key 2 currently is with respect to the initial rotation position.

If the operator puts a finger close to the touch pad 26 arranged on the surface side of the entry key 2 and makes an input operation, an input position detection signal indicating the input operation position is wirelessly transmitted by using the RF transmission and reception circuit 24 and the transmission and reception antenna 25 for transmitting the lock signal. The input position detection signal is input to the vehicle-side MCU 36 via the transmission and reception antenna 37 and the RF transmission and reception circuit 38 on the vehicle side. The vehicle-side MCU 36 corrects the input position detection signal input thereto into an input operation position expressed with reference to the initial rotation position on the basis of the relative rotation direction and the relative rotation angle between the current rotation position and the initial rotation position. The vehicle-side MCU 36 outputs a control signal generated on the basis of the corrected input operation position to the controlled apparatus, whereby the controlled apparatus is controlled. The touch pad 26 has a circular outline about the center. Even if the entry key 2 is rotated from the initial rotation position, the operator can thus make an input operation without being conscious of the rotation of the touch pad 26, i.e., with a feeling of making an input operation on the touch pad 26 in the initial rotation position.

If the shift level of the vehicle is set to the parking position and a press-down operation is made on the power switch 43 again, the main electronic devices of the vehicle except those operating during standby, such as the capacitance detection circuit 35, stop operation. Then, the key of the power switch 43 is periodically turned on and off. At the same time, the exciting current flowing through the solenoid coil of the electromagnetic solenoid 32 is stopped, and the electromagnetic solenoid 32 stops the attracting operation. The entry key 2 stopped being attracted can be easily taken out of the circular recess 4 by putting a finger into the gap between the periphery of the entry key 2 and the guide recess 42. For safe driving of the vehicle, the main electronic devices of the vehicle are configured to not stop operation and be able to continue driving the vehicle without a problem even if the entry key 2 is detached from the circular recess 4 other than when the shift lever of the vehicle is in the parking position.

The driver opens the door, gets away from the vehicle, and makes a press-down operation on the locking switch 28 of the entry key 2. The lock signal for locking control is wirelessly transmitted from the entry key 2. The lock signal is input to the vehicle-side MCU 36 from the transmission and reception antenna 37 on the vehicle side. The vehicle doors are controlled to lock according to the input lock signal.

The foregoing entry key 2 is configured so that its circuit elements operate with the button battery 22 accommodated in the battery accommodation portion 51 as a power source. The button battery 22 may be a secondary battery 71 that is charged from the vehicle side while the entry key 2 is accommodated in the circular recess 4.

A vehicle input device 70 according to another embodiment, using the secondary battery 71 as the power source of the entry key 2, will be described below with reference to FIG. 15. This vehicle input device 70 differs from the foregoing embodiment only in the configuration related to a charging circuit for charging the secondary battery 71. In the diagram, configurations having identical or similar functions to those of the components of the vehicle input device 1 are therefore designated by the same reference numerals, and descriptions thereof will be omitted.

Figure 15:
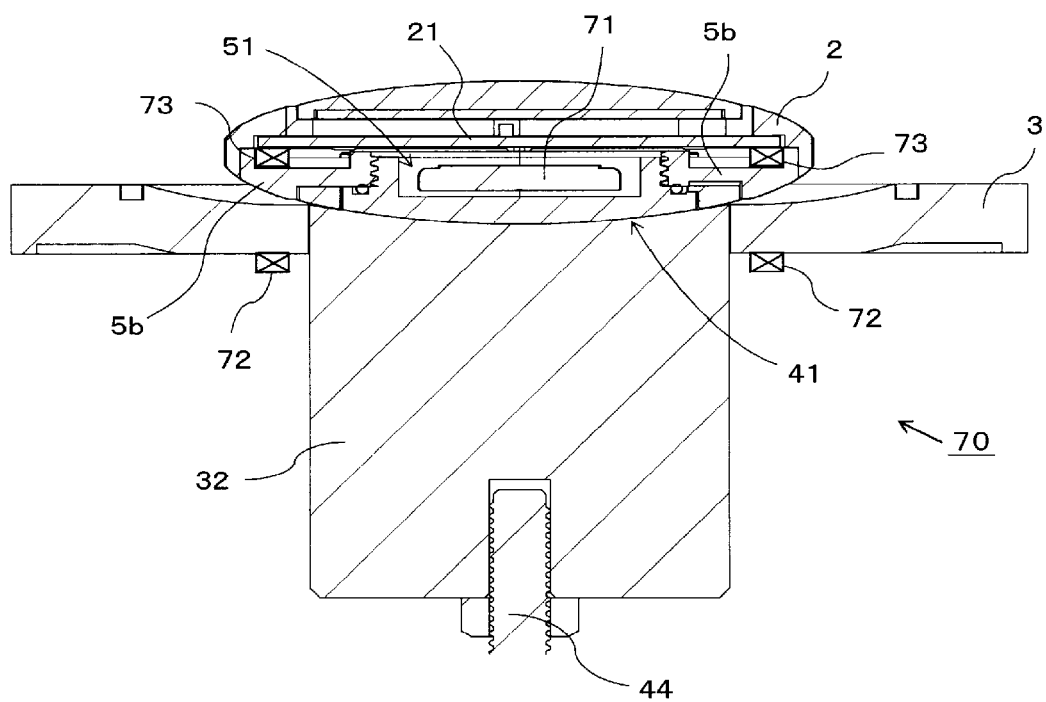
FIG. 15 is a longitudinal sectional view showing essential parts of a vehicle input device 70 according to another embodiment.

As shown in FIG. 15, the vehicle input device 70 includes a primary coil 72 for passing a charging current from the vehicle side. The primary coil 72 is provided on the back side of the center console 3 and wound about the center axis, around the positioning recess 41 to which the electromagnetic solenoid 32 is fit with play. The lower case 5b on the side of the entry key 2 includes a secondary coil 73. The secondary coil 73 is wound about the center of the case 5 of disc-like shape with the same diameter as that of the primary coil 72. Both ends of the secondary coil 72 are connected to a pair of electrodes of the secondary battery 71, which is accommodated in the battery accommodation portion 51 instead of the button battery 22, via a charging circuit mounted on the printed circuit board 21.

If a press-down operation is made on the power switch 43, a charging current is caused to flow through the primary coil 72. While the charging current is flowing through the primary coil 72, the electromagnetic solenoid 32 makes an attracting operation to position and accommodate the entry key 2 in the circular recess 4. The primary coil 72 and the secondary coil 73 are vertically opposed to each other in parallel about the same center axis. The charging energy on the side of the primary coil 72 is thus effectively transmitted to the side of the secondary coil 73 by electromagnetic induction, and an induced current flows through the secondary coil. By using the induced current flowing through the secondary coil 73, the charging current charges the secondary battery 71 with a constant charging voltage up to full charge.

The circuits of the entry key 2 operate with the secondary battery 71 which is naturally charged from the vehicle side while the entry key 2 functions as an input operation key accommodated in the circular recess 4 of the vehicle. The operator can thus use the entry key 2 without being conscious of low battery. The entry key 2 therefore does not need the battery detection circuit 54.

If the entry key 2 is positioned to the circular recess 4, the primary coil 72 and the secondary coil 73 are arranged about the same center axis. The secondary battery 72 can be charged from the vehicle side in a noncontact manner without loss of electromagnetic induction energy.

In the foregoing embodiments, the entry key 2 is described to be rotatably accommodated in the circular recess 4 and used as an input operation key to be operated to rotate. However, the entry key is not limited to a rotatably accommodated one as long as the entry key is positioned to be movable with respect to a predetermined input operation direction. For example, the entry key may be vertically or laterally movably accommodated in an accommodation recess of a housing fixed to the vehicle, and the movement may be detected by a switch facing the accommodation recess. From such a reason, the shape of the entry key is not limited to a disc-like shape.

The rotating operation of the entry key 2 is detected from the rotation of the electromagnetic solenoid 32 which rotates integrally with the entry key 2. However, a detection part of the rotary encoder may be located to face the interior of the circular recess 4 so that the rotation of the entry key 2 is directly detected.

The entry key 2 is described to be positioned to and accommodated in the circular recess 4 of the center console 3. However, the housing fixed inside the vehicle may be surrounded by a decorative plate such as an instrumental panel or by a case that is integrally fixed to such a decorative plate, and the entry key 2 is positioned and accommodated to be movable in a certain input operation direction.

The flat surface of the electromagnetic solenoid 32 is arranged to directly face the interior of the circular recess 4 and constitute the bottom surface of the positioning recess 41. However, the flat surface of the electromagnetic solenoid 32 may be covered with a thin protective film and arranged along the bottom surface of the positioning recess 41.

The lock signal transmitted from the entry key 2 may be not received by the transmission and reception antenna 25 of the vehicle input device 1. An existing reception antenna and control circuit in the vehicle may be used to perform unlocking control on the vehicle doors.

In the foregoing embodiments, only the power switch 43 is arranged, as an example, around the circular recess 4 in which the entry key 2 is positioned and accommodated. Auxiliary input switches other than the power switch 43, such as a determination key, and display elements may also be arranged.

In the foregoing embodiments, the lock signal for unlocking control is wirelessly transmitted from the transmission and reception antenna 25 of the entry key 2 in response to a press-down operation on the unlocking switch 27 of the entry key 2. Instead, the lock signal may be configured to be wirelessly transmitted from the entry key 2 on a regular basis so that the vehicle doors are unlocked without a press-down operation on the unlocking switch 27.

In the foregoing embodiments, the detecting means based on a change in capacitance is used as the approach detecting means 35. However, the approach detecting means 35 are not limited thereto. For example, a light emitting element and a light receiving element may be used to constitute detecting means that operates on the basis of a change in the amount of received light detected by the light receiving element as the entry key 2 approaches. Alternatively, means capable of measuring the value of the current flowing through a solenoid may be provided as other detecting means. Such detecting means operates on the basis of a change in the current value due to a change of a magnetic flux caused by the approach of the entry key 2.

In the foregoing embodiment where the button battery 22 is used as the power source of the entry key 2, means for detecting the presence or absence of attraction by the electromagnetic solenoid 32 may be added to the entry key 2. When the entry key 2 is not attracted to the electromagnetic solenoid 32, the operation of the touch pad may be disabled or otherwise controlled to suppress needless power consumption in the entry key 2. This can suppress the power consumption of the button battery 22 to reduce the frequency of replacement of the button battery 22.

The present invention is suitable for a vehicle input device that uses the entry key itself for unlocking or locking the vehicle doors as an input operation key for controlling other controlled apparatuses.

REFERENCE SIGNS LIST

1 vehicle input device
2 entry key
23 key-side MCU
24 RF transmission and reception circuit (wireless transmission means)
25 transmission and reception antenna
26 touch pad
3 center console (housing)
31 plunger
32 electromagnetic solenoid
33 rotary encoder (input detecting means)
34 click wheel
34a, 34b, 34c, 34d recess grooves
35 approach detecting means
36 vehicle-side MCU (control means)
4 circular recess
41 positioning recess
42 guide recess 5 case
52 cover
70 vehicle input device according to second embodiment
71 secondary battery
72 primary coil
73 secondary coil

The invention claimed is:

1. A vehicle input device comprising:
an entry key that includes a wireless transmitter, for wirelessly transmitting a lock control signal for unlocking or locking a door of a vehicle, and a case that has an outer periphery formed in a disc-like shape to be accommodated in a circular recess formed in a housing fixed inside the vehicle, at least a part of a bottom surface of the case being made of a ferromagnetic material;
an electromagnetic solenoid that is attached to be rotatable about a center axis of the circular recess along an inner bottom surface of the circular recess, and is attracted to the bottom surface of the case accommodated in the circular recess to position the entry key to the circular recess so as to be rotatable about the center axis;
input detecting means for, if the entry key positioned by the electromagnetic solenoid rotates about the center axis, detecting the rotation of the entry key from rotation of the electromagnetic solenoid that is attracted to the bottom surface of the case of the entry key and rotates integrally with the entry key; and
a controller for outputting a control signal for controlling an operation of a controlled apparatus installed in the vehicle on the basis of a detected signal detected by the input detecting means.

2. The vehicle input device according to claim 1, wherein
the bottom surface of the case of the entry key is formed in a spherical crown shape with a lowest point at the center;
the bottom surface of the circular recess includes a positioning recess that has a diameter smaller than an outer diameter of the case of disc-like shape and is formed to curve about the center axis with approximately the same curvature as that of the bottom surface of the case, and a guide recess of spherical zone shape that surrounds the positioning recess about the same center axis and is formed to curve with a curvature smaller than that of the positioning recess; and
the electromagnetic solenoid is attached along an inner bottom surface of the positioning recess.

3. The vehicle input device according to claim 1, wherein a click wheel that rotates integrally with the electromagnetic solenoid about the center axis and has a plurality of recess grooves formed in a bottom surface radially from the center axis is attached to the electromagnetic solenoid, and a spherical body is biased toward the click wheel so as to make an elastic contact with the bottom surface of the click wheel and be able to come into and out of the recess grooves.

4. The vehicle input device according to claim 1, wherein the entry key includes a buttery accommodation portion that opens in the bottom surface of the case, and the opening of the battery accommodation portion is covered with a cover made of a ferromagnetic material.

5. The vehicle input device according to claim 4, further comprising approach detecting means for detecting approach of the entry key to the circular recess from a change in a sensing amount due to the approach of the entry key, and wherein
an exciting current is allowed to pass through a solenoid coil of the electromagnetic solenoid while the approach detecting means detects the approach of the entry key to the circular recess.

6. The vehicle input device according to claim 1, wherein the housing includes a primary coil that is wound about the center axis of the circular recess, and the entry key includes a secondary coil that is wound about the center of the case of disc-like shape and a secondary battery that is charged with an induced current flowing through the secondary coil due to electromagnetic induction with the primary coil.

7. The vehicle input device according to claim 1, wherein the entry key further includes a touch pad that is arranged to be able to detect an input operation on its surface, and input position detecting means for detecting an input operation position on the touch pad; and the wireless transmitter wirelessly transmits the detected input operation position to the controller or the controlled apparatus to which the controller outputs the control signal.

8. The vehicle input device according to claim 1, wherein
the entry key further includes a touch pad that is arranged to be able to detect an input operation on its surface, and input position detecting means for detecting an input operation position on the touch pad, to wirelessly transmit and output the detected input operation position to the controller, and
the controller converts the input operation position input from the entry key into an absolute input operation position fixed to the housing on the basis of a rotation direction and a rotation angle of the electromagnetic solenoid detected by the input detecting means, and outputs the control signal for controlling operation to the controlled apparatus on the basis of the absolute input operation position.

9. The vehicle input device according to claim 1, further comprising positioning detecting means for detecting that the entry key is positioned by the electromagnetic solenoid, and wherein
the vehicle is enabled to travel on condition that the positioning detecting means detects that the entry key is positioned.

* * * * *